Figure 1:
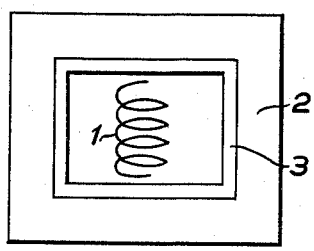

Oct. 22, 1963 R. MYKLEBUST 3,108,241
REACTOR FOR DIRECT CURRENT WITH ALTERNATING CURRENT
SUPERIMPOSED ON THE DIRECT CURRENT
Filed Nov. 27, 1961

INVENTOR.
Roger Myklebust
BY
Bailey, Stephens & Huettig
ATTORNEYS 3,108,241
REACTOR FOR DIRECT CURRENT WITH ALTERNATING CURRENT SUPERIMPOSED ON THE DIRECT CURRENT
Roger Myklebust, Ludvika, Sweden, assignor to Allmanna Svenska Elektriska Aktiebolaget, Vasteras, Sweden, a Swedish corporation
Filed Nov. 27, 1961, Ser. No. 155,077
Claims priority, application Sweden Dec. 13, 1960
1 Claim. (Cl. 336—211)

The present invention relates to a reactor for direct current with superimposed alternating current, so-called smoothing reactor.

Since the magnetic field from a reactor winding induces currents in metal objects situated in the vicinity of the reactor winding, it is often necessary to surround this by a core or sheath of magnetic material or a screen of, for example, copper. In certain cases the reactor winding is provided with a core of magnetic material in order to increase the inductance of the reactor.

When the current through a smoothing reactor has an alternating current component, the core in known constructions has been made of laminated plates which are interleaved in a similar way to a transformer core. It is also known to arrange magnetic shunts around the reactor but these shunts do not, however, satisfactorily solve the screening problem. When using copper screens for screening the pulsing magnetic flux, eddy currents are formed in the screen, which give rise to losses, so that the method is preferably used when the reactance cannot be permitted to be current dependent or when it is necessary to limit the weight of the reactor. A core or sheath of laminated plates according to known constructions is expensive and can, according to the invention, with smoothing reactors, be replaced by a solid outer core of normal structural steel which on its inside is lined with a layer of laminated plate. The idea with this arrangement is that the magnetic alternating flux formed by the sueperimposed alternating current will flow through the laminated layer while the magnetic direct flux formed by the direct current component of the current will flow completely or partly through the outer unlaminated part of the core. The laminated part of the core is thus dimensioned for the whole magnetic alternating flux and in certain cases for a part of the direct flux formed by the direct current component of the current, while the outer, unlaminated part of the core is dimensioned only for the direct flux. Since already at low frequencies the magnet alternating flux has a relatively small penetrating depth, this flows through the inner laminated part of the core. The invention is characterised in that the iron core or sheath which forms a magnetic path for the flux generated by the reactor winding is so formed that the parts of this situated nearest the ends of the reactor winding consist of a layer of laminated electro-plates dimensioned for at least the magnetic flux caused by the alternating current component of the direct current, whilst on the other hand those parts of the core situated outside the said laminated part are made of ordinary structural steel or comparable magnetic material.

Figure 2:
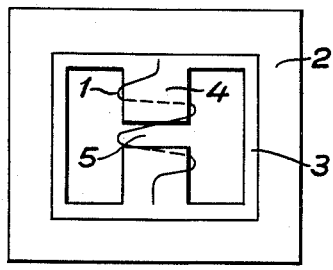
Figure 3:
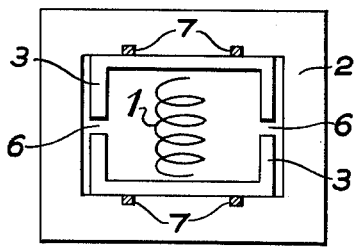

The invention is described in the following with reference to the accompanying schematical drawing, in which FIGURE 1 shows a reactor according to the invention provided with a reactor winding wound on a non-magnetic support. FIGURE 2 shows a reactor according to the invention with the reactor winding wound on a core leg of magnetic laminated material joined magnetically to the outer core and provided with an air gap. FIGURE 3 shows an embodiment, in which the inner laminated layer is provided with air gaps.

In the arrangement according to FIGURE 1 the reactor winding 1 is wound on a non-magnetic support and placed within a sheath or core of magnetic material surrounding the reactor winding, said core consisting of an outer part 2 of ordinary structural steel and an inner part 3 of laminated plate. When a direct current having an alternating current superimposed on the direct current flows through the reactor winding 1, a magnetic field is formed which is screened from the surroundings of the reactor by the core which encases the reactor winding 1. When the magnetic field, because of the character of the current, becomes pulsating, a solid core cannot be used since the alternating flux propelled in this would induce great eddy currents in the solid and electrically conducting material. Since the magnetic alternating flux has a relatively small penetrating depth, with an arrangement according to the invention, it will confine itself to the inner laminated part 3 of the core, in this way reducing eddy current losses. The constant magnetic direct flux, however, distributed itself substantially equally over the complete cross section of the iron core but since this direct flux does not cause eddy currents, the outer part 2 of the core can be manufactured of solid magnetic material. The outer unlaminated sheath of the core can also with advantage serve as an element keeping the construction together.

FIGURE 2 shows a reactor with a reactor winding 1 which is wound on a completely laminated magnetic core leg 4 provided with an air gap 5. The core leg 4 is interleaved with the inner lamination 3 of the surrounding core to effect good flux transfer between the core leg 4 and the core. As in the previously described embodiment the core is provided with an outer layer 2 of unlaminated structural steel.

FIGURE 3 shows a special embodiment of the inner laminated part 3 of the core in combination with a winding arrangement according to FIGURE 1, but an arrangement according to this embodiment can of course be used in combination with all previously mentioned embodiments of the invention.

The reactor windings designated 1 in FIGURE 3 are on non-magnetic supports, not shown, placed inside the iron core which consists of an outer, unlaminated part 2 and an inner laminated part 3. The inner laminated part 3 is provided with air gaps 6 and the outer, solid part 2 with inserted copper rings 7 which form short-circuited layers. In the previously described embodiments of the invention, the direct flux has to a great extent been distributed evenly over the area of the core, so that the laminated part 3 of the core must also be dimensioned for part of the direct flux. In the embodiment according to FIGURE 3, the direct flux is prevented from flowing through the laminated part 3 of the core by means of air gaps 6 being suitably placed in the laminated inner part 3. When the direct flux is prevented from flowing through the laminated part of the core, this naturally needs to be dimensioned only for the alternating component of the flux which means that its area is reduced. Because of the air gaps 6 in the laminated part 3, of course, the alternating flux also has a tendency to flow through the solid part 2 of the core. The penetration of the alternating flux into the solid part 2 of the core is, however, impeded by the eddy currents which arise in this. Instead of it is possible to allow eddy currents to be generated by short circuited layers 7 of copper rings inserted in the iron. This latter embodiment of course involves increased eddy current losses but, on the other hand, gives complete freedom in choosing suitable flux tightness for the two parallel connected flux paths. In certain cases it may be advantageous to increase the dampening of harmonics arising in the current in this way.

It is of course possible within the scope of the invention to effect constructions which do not coincide with the suitable embodiments shown here. Thus, the reactors could be provided with several core legs or with a sheath completely enclosing the reactor winding. It is also possible to shape the core or sheath as a cylinder or part thereof.

I claim:

Reactor for direct current with alternating current superimposed on the direct current, said reactor having a reactor winding and an iron core serving as a magnetic path for the magnetic flux generated by said reactor winding, said iron core surrounding said reactor winding, said iron core having a laminated part and a solid part, said laminated part being arranged nearest to and enclosing said reactor winding, said solid part being positioned outside said laminated part and enclosing said laminated part and said reactor winding.

References Cited in the file of this patent

UNITED STATES PATENTS

| | | |
|---|---|---|
| 1,504,611 | Dorfman | Aug. 12, 1924 |
| 1,566,333 | Lucas | Dec. 22, 1925 |
| 1,694,318 | Grunholz | Dec. 4, 1928 |
| 1,891,178 | Porter | Dec. 13, 1932 |
| 2,284,406 | D'Entremont | May 26, 1942 |
| 2,445,408 | Root | July 20, 1948 |
| 2,498,475 | Adams | Feb. 21, 1950 |